US007707853B2

(12) United States Patent
Schroeder et al.

(10) Patent No.: US 7,707,853 B2
(45) Date of Patent: May 4, 2010

(54) PROCESS FOR PARTIAL SHAPING OF FLAT GLASS OR GLASS-CERAMIC ARTICLES AND APPARATUS FOR PERFORMING SAME

(75) Inventors: Friedrich-Georg Schroeder, Ingelheim (DE); Roland Hochhaus, Mainz (DE); Bernd Weitzel, Woellstein (DE); Bernd Hoppe, Ingelheim (DE); Hermann Lemm, Dellhofen (DE); Gerhard Hahn, Allenfeld (DE); Hans-Walter Abraham, Darmstadt (DE)

(73) Assignee: Schott AG, Mainz (DE)

( * ) Notice: Subject to any disclaimer, the term of this patent is extended or adjusted under 35 U.S.C. 154(b) by 445 days.

(21) Appl. No.: 11/113,744

(22) Filed: Apr. 25, 2005

(65) Prior Publication Data
US 2005/0183459 A1 Aug. 25, 2005

Related U.S. Application Data

(62) Division of application No. 10/086,151, filed on Feb. 28, 2002, now Pat. No. 6,990,835.

(30) Foreign Application Priority Data
Mar. 3, 2001 (DE) ................................ 101 10 357

(51) Int. Cl.
C03B 23/00 (2006.01)
C03B 23/02 (2006.01)
C03B 23/035 (2006.01)
(52) U.S. Cl. .............................. 65/273; 65/268; 65/287; 65/374.13
(58) Field of Classification Search .................. 65/268, 65/374.13, 273, 287
See application file for complete search history.

(56) References Cited

U.S. PATENT DOCUMENTS 1,478,126 A * 12/1923 Lewis et al. .................... 65/260

(Continued)

FOREIGN PATENT DOCUMENTS

DE 25 28 421 12/1976

(Continued)

*Primary Examiner*—Eric Hug
*Assistant Examiner*—Cynthia Szewczyk
(74) *Attorney, Agent, or Firm*—Michael J. Striker

(57) ABSTRACT

In the process for partially shaping, a glass/glass ceramic article (5) is held on a planar support plate (1) by suction. The glass/glass ceramic article is heated to soften it, so that it has a viscosity below $10^6$ dPa·s. After the softening one or more shaping dies (4) is or are moved upward through an opening or respective openings (3) in the support plate to form raised regions in the softened glass/glass ceramic article (5). The suction force is produced by a low pressure in a hollow compartment (2) below the support plate (1) and acts on the glass/glass ceramic article (5) by means of a gap (G) formed between each shaping die (4) and the support plate. Additional openings can be provided in the support plate and/or in one or more of the shaping dies to assist in applying the suction force to the glass/glass ceramic article. After solidification of the softened glass/glass-ceramic article the shaping die or dies (4) is or are withdrawn. Then the partially shaped glass/glass ceramic product is removed by compressed air and/or mechanically with lifting members (8). An apparatus for performing this process is also described.

10 Claims, 1 Drawing Sheet

U.S. PATENT DOCUMENTS

| | | | |
|---|---|---|---|
| 3,582,304 A | * | 6/1971 | Bognar .......................... 65/105 |
| 3,819,349 A | * | 6/1974 | Shimizu et al. ................. 65/63 |
| 3,964,856 A | * | 6/1976 | Day ............................ 425/503 |
| 4,047,915 A | * | 9/1977 | Schaffernicht et al. ........ 65/106 |
| 4,229,200 A | * | 10/1980 | Seymour ..................... 65/106 |
| 4,516,997 A | * | 5/1985 | Derner et al. ................. 65/106 |
| 4,778,507 A | * | 10/1988 | Aruga et al. .................. 65/106 |

FOREIGN PATENT DOCUMENTS

| | | | |
|---|---|---|---|
| JP | 2002307542 A | * | 10/2002 |

* cited by examiner

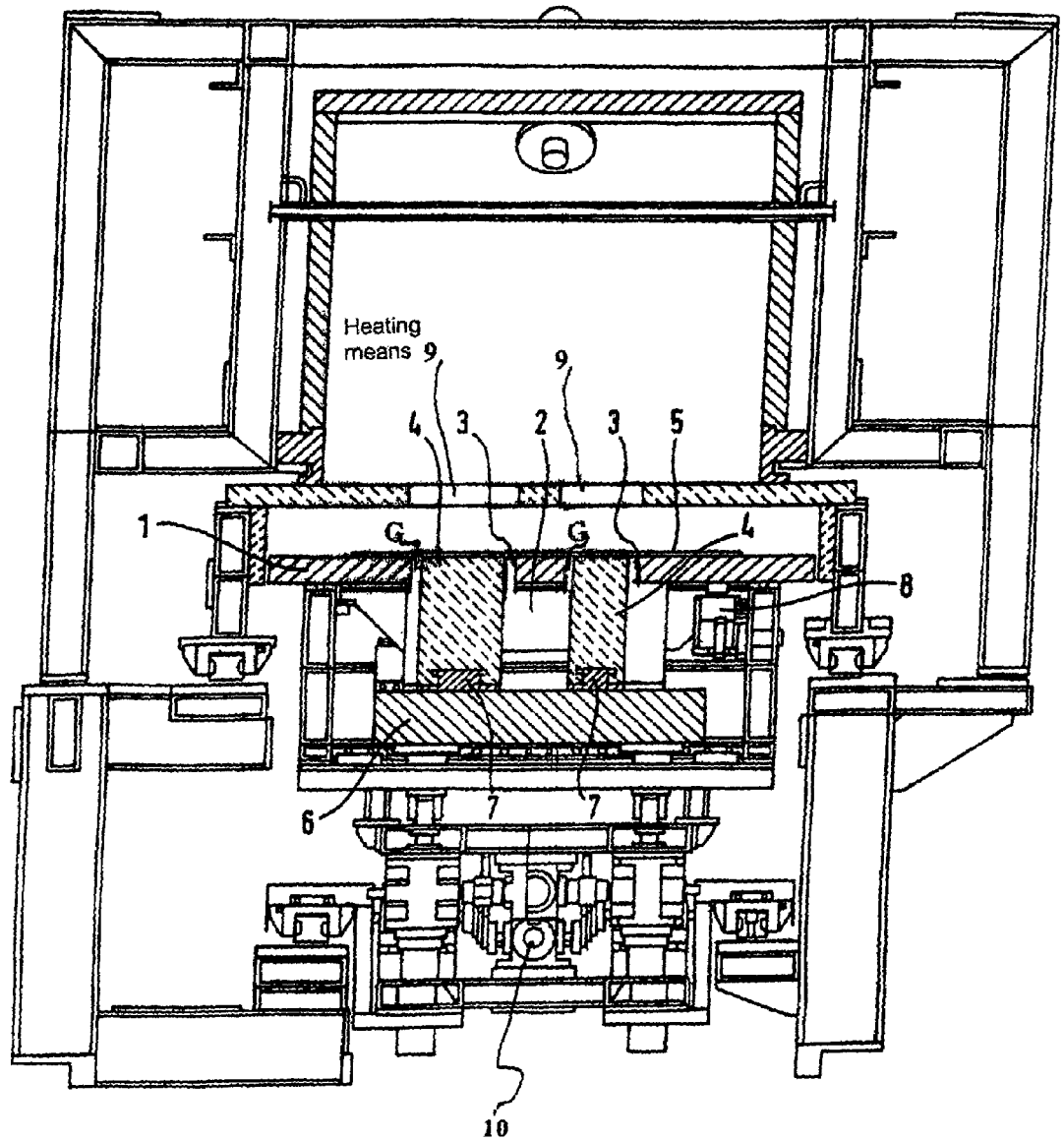

PROCESS FOR PARTIAL SHAPING OF FLAT GLASS OR GLASS-CERAMIC ARTICLES AND APPARATUS FOR PERFORMING SAME

CROSS-REFERENCE

This is a divisional of U.S. patent application Ser. No. 10/086,151, filed Feb. 28, 2002, which has now matured into U.S. Pat. No. 6,990,835, issued on Jan. 31, 2006.

BACKGROUND OF THE INVENTION

1. Field of the Invention

The present invention relates to a process for partial shaping of flat glass or comparable glass-ceramic articles. It also relates to an apparatus for performing that process.

2. Description of the Related Art

A pre-shaped flat glass article, which comes in the form of a table or in the form of an endless sheet, and/or a correspondingly formed glass-ceramic article, frequently must be partially shaped for certain application purposes. This shaping includes, for example, the formation of a turned up or raised edge region around a hole, the flanging of an outer edge or the formation of depressed or raised regions in glassy table tops, glass doors or glass-ceramic cook tops.

In practice different shaping methods have been used for this purpose. The shaping techniques according to the prior art include sinking under its own weight, pressing, imprinting or vacuum drawing.

A substantial disadvantage of the method of sinking under its own weight is the limited degree of shaping that can be obtained. Only limited forms can be obtained, especially sharp edged shapes or narrow radii.

The main disadvantage of the pressing and imprinting methods is that a forming material or tool must come into contact with the surface of the glass or the glass-ceramic part so that there is an inherent quality loss at the surface.

The disadvantage of vacuum drawing is the necessity of positive contact with the edge region or rim of the glass or glass-ceramic part around the shaping region, so that no vacuum loss arises at the onset of the shaping process. Usually the process is exclusively used for drawing softened glass and/or glass-ceramic masses into cavities of a mold that is planar at the edges.

A process and associated apparatus for making glass bodies for electronic tubes, especially display screen parts, are disclosed in DE 25 28 421 A1. In this process a substantially planar glass plate is received in a holding or clamping unit at its rim or edge region as a starting product (semi-finished product). It is then heated over the softening point of the glass in a burner and then shaped by means of a suitably formed die or press member. The holding or clamping unit is generally formed so that overpressure or under pressure can be produced in the space under the glass plate, whereby the shaping process of the glass plate can also be influenced. In case of an under pressure an actual vacuum drawing method is described.

These known methods however cannot be used for the partial shaping of flat glass and/or comparable glass-ceramic articles or parts.

SUMMARY OF THE INVENTION

It is an object of the present invention to provide a process and associated apparatus of the above-described kinds for partial shaping of a glass or glass ceramic article, so that concave contours of a complex nature can be provided in a flat glass or glass ceramic article by bringing a shaping die or tool into contact with only one side of the flat glass or flat glass ceramic article.

This object and others, which will be made more apparent hereinafter, according to one aspect of the present invention, are attained by a process for partial shaping of a flat glass part or a glass ceramic part comprising the steps of:

a) placing a flat glass or glass ceramic article on a planar support with an entire facing surface of the flat glass or glass ceramic article resting fully on the planar support, the planar support having at least one through-going shaping opening in a shaping region;

b) producing a low pressure in a space below the planar support to hold the flat glass or glass ceramic article fixed on the planar support;

c) partially heating the flat glass or glass ceramic article in the vicinity of the shaping region on the planar support until at least a part of the flat glass or glass ceramic article softens;

d) providing at least one shaping die in the at least one through-going shaping opening in the planar support in an initial position below the flat glass or glass ceramic article on the planar support prior to the partial shaping, preferably with a gap between the at least one shaping die and a respective edge of the planar support at the at least one through-going opening to assist in fixing or holding the flat glass or glass ceramic article on the planar support by means of the low pressure;

e) raising the at least one shaping die provided in the at least one through-going shaping opening over a predetermined distance into the softened part of the glass or glass ceramic article at the same time as the producing of the low pressure in the space below the planar support;

f) then cooling a partially shaped glass or glass ceramic product formed from the glass or glass ceramic article by the heating, the low pressure and the raising of the at least one shaping die;

g) withdrawing the at least one shaping die from a solidified portion of the partially shaped glass or glass ceramic product; and h) removing the partially shaped glass or glass ceramic product from the support plate.

The above object and others, which will be made more apparent hereinafter, according to another aspect of the present invention, are attained by an apparatus for partial shaping of flat glass or comparable glass ceramic parts comprising a planar support plate for receiving and supporting a flat glass or glass ceramic article so that the flat glass or glass ceramic article rests with an entire surface thereof fully on the planar support plate, the planar support plate being arranged over a substantially airtight hollow compartment and having at least one through-going shaping opening to the substantially airtight hollow compartment;

a respective shaping die engaged in each of the at least one through-going shaping opening with a predetermined peripheral gap between each shaping die and the planar support plate, so that each shaping die is substantially flush with an upper surface of the planar support plate in an initial position and is movable upward from that initial position to extend to a predetermined displaced position above the upper surface of the planar support plate;

vacuum-producing means for producing a low pressure in the airtight compartment;

heating means for partially heating the glass or glass ceramic article in the vicinity of the at least one through-going shaping opening prior to performing the partial shaping; and ejecting means for removing a finished glass or glass ceramic product from the planar support plate after the partial shaping.

The features according to the invention not only facilitate the formation of concave contours or shapes in cavities by vacuum drawing or suction, but also at the same time permit the formation of raised or embossed regions with tight radii and complex contours while only contacting the shaping tool or die on a bottom side of the article.

In a preferred embodiment of the process a rapid and effective heating of the glass or glass ceramic article takes place by means of IR radiation or gas burner.

An accurate shaping is possible in the process according to the invention when a partial heating to reach a glass or glass ceramic material viscosity below $10^6$ dPa·s is performed.

In the case of glass ceramic articles in a preferred embodiment of the process the heating is performed during a time interval of less than 30 s, because of the great tendency of glass ceramic material to crystallize.

In preferred embodiments of the process for partial shaping the cooling of the partially shaped glass or glass ceramic product is assisted by blowing air or directing an air stream at the partially shaped glass or glass ceramic article so that the processing time is short.

To guarantee a reliable and safe removal of the partially shaped glass or glass ceramic product the glass or glass ceramic product is raised by means of lifting pins or members and/or by action of compressed air.

Various embodiments of the apparatus for partial shaping of the glass or glass ceramic article are possible.

In order to provide the highest possible service life the planar support plate and shaping die are made from heat-resistant metal or a ceramic material.

The operation of the shaping die is especially easy when a vertically movable base plate is arranged in the airtight hollow compartment so that it can travel vertically in the airtight hollow compartment. A ram is rigidly connected with the shaping die or dies, whose length determines the shaping height or depth in the softened glass or glass ceramic article. The ram is mounted on or attached to the base plate, so that the shaping die or dies move upward from an initial position into the softened glass or glass ceramic article when the base plate moves vertically upward.

In preferred embodiment of the apparatus according to the invention the support plate and/or the shaping die has additional passages or holes and/or is made from a porous material in order to provide the most secure support of the glass or glass ceramic article during shaping.

In various advantageous preferred embodiments of the apparatus lifting pins or members and/or means for supplying compressed air are provided in order to provide a safe and secure removal of the partially shaped glass or glass ceramic product from the apparatus.

BRIEF DESCRIPTION OF THE DRAWING

The objects, features and advantages of the invention will now be illustrated in more detail with the aid of the following description of the preferred embodiment, with reference to the accompanying sole FIGURE, which is a cross-sectional view through a preferred embodiment of the apparatus for partial shaping of a glass or glass ceramic article or part according to the invention.

DESCRIPTION OF THE PREFERRED EMBODIMENT

The preferred embodiment of the apparatus for partial shaping of glass or glass ceramic parts shown in the FIGURE includes a support plate 1, preferably made of a heat-resistant metal, e.g. 17% chromium steel, or from ceramic material, e.g. from silicon dioxide. The support plate 1 is arranged over a substantially airtight hollow compartment 2. However the support plate 1 is provided with a plurality of through-going holes or through-going shaping openings 3. Shaping dies 4 are arranged in the respective holes 3, which are made from the above-described material, and fit in the respective holes 3 with a comparatively small gap G between them and the adjacent edge of the support plate 1. At the beginning of a shaping process the shaping dies 4 are in an initial position flush with an upper surface of the support plate 1. A planar glass sheet 5 to be partially shaped rests with its facing surface fully on the support plate 1 but with another surface on a side opposite from the facing surface free of contact with any part of the apparatus.

During the shaping a vacuum or low pressure is produced in the nearly airtight hollow compartment 2 under the support plate 1 by a pump or vacuum-producing device 10. The glass sheet 5 is thus drawn down onto the support plate 1 and held there.

The glass sheet 5 to be partially shaped, at least in the shaping region in the vicinity of the shaping dies, is heated by a heating means 9, until it softens, i.e. until the viscosity of the glass is preferably below $10^6$ dPa·s. The heating means 9 is preferably an IR radiator or a gas burner. In the case of a glass ceramic article this heating process should be performed very rapidly (<30 sec) to about 1000° C. because of the higher tendency of the glass ceramic material to crystallize. Thus high heating power (up to 1 MW/m²) is usually required in the case of glass ceramic articles.

A base plate 6 is provided under the hollow compartment 2, on which a ram or rams 7 are arranged. The shaping die or dies 4 are firmly attached to the ram or respective rams 7. During the partial shaping the base plate 6 is raised far enough so that the shaping die or dies 4 are lifted or raised by means of the ram or rams 7 over the desired predetermined shaping distance. Different embodiments can provide different shaping depths or heights in the glass or glass ceramic article with different base plates 6 having different rams of different lengths for several shaping dies 4.

The drawing force provided by the vacuum or low pressure in the hollow compartment 2 can act on the glass article 5 because of the gap G formed between the shaping die 4 and the support plate 1 at the respective through-going shaping openings 3 in the support plate 1. Additional holes provided in the shaping dies 4 and/or the support plate 1 assist in permitting the suction to act on the glass sheet or article 5 to be partially shaped. Furthermore if the support plate 1 and/or the shaping dies 4 are made of porous material the suction can act even more easily on the glass article 5.

According to the particular side of the glass or glass ceramic article that rests on the support plate 1 or is actually used, depressed regions or raised regions are formed in the facing side of the glass or glass ceramic article.

After subsequent solidification of the glass sheet or article because of cooling after turning the heating means off, the shaping die or dies 4 are withdrawn by lowering the base plate 6. Then the partially shaped glass product is raised by means of lifting members 8 so that it can be removed from the apparatus. Alternatively or in addition, compressed air can be used to remove the shaped glass article.

The remaining parts of the apparatus that have not been described are conventional components of a unit for glass processing, for example the movable machine beds, the associated warming ovens, etc.

The disclosure in German Patent Application 101 10 357.3-45 of Mar. 3, 2001 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a process for partial shaping of flat glass or glass-ceramic articles and apparatus for performing same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An apparatus for partial shaping of a flat glass or glass ceramic part, said apparatus comprising:

a planar support plate having an upper plane surface on which an entire facing surface of the flat glass or glass ceramic article rests fully during the partial shaping, wherein said planar support plate is provided with at least one through-going shaping opening in a shaping region;

means for producing a low pressure in a hollow compartment below the planar support plate to hold the flat glass or glass ceramic article fixed on the planar support plate during the partial shaping so that the flat glass or glass ceramic article extends over and covers the at least one through-going shaping opening;

means for partially heating the flat glass or glass ceramic article in the vicinity of the shaping region on the planar support plate until at least a part of the flat glass or glass ceramic article softens;

at least one shaping die arranged in the at least one through-going shaping opening in the planar support plate in an initial position prior to the partial shaping, in which the at least one shaping die is flush with the upper plane surface of the planar support plate;

means for raising the at least one shaping die arranged in the at least one through-going shaping opening over a predetermined shaping distance into said part of said flat glass or glass ceramic article that is softened by said means for partially heating during the partial shaping at the same time as the means for producing the low pressure in said hollow compartment below the planar support plate is operated to produce the low pressure and thus hold the flat glass or glass ceramic article fixed on the planar support plate over the at least one through-going opening;

means for cooling a partially shaped flat glass or glass ceramic product formed from the flat glass or glass ceramic article by said means for said partially heating, said means for producing said low pressure and said means for said raising of said at least one shaping die;

means for withdrawing said at least one shaping die from a solidified portion of the partially shaped flat glass or glass ceramic product;

means for removing the partially shaped flat glass or glass ceramic product from the planar support plate;

wherein the means for producing the low pressure generates a drawing force during the partial shaping that acts on the flat glass or glass ceramic article to hold the flat glass or glass ceramic article on the planar support plate with an entire side of the flat glass or glass ceramic article free from contact with any part of the apparatus during the partial shaping; and wherein said entire side of the flat glass or class ceramic article is opposite from a side of the flat glass or glass ceramic article on which the entire facing surface that faces the planar support plate is located.

2. The apparatus as defined in claim 1, wherein said planar support plate and said at least one shaping die are made from a heat-resistant metal.

3. The apparatus as defined in claim 1, wherein said planar support plate and said at least one shaping die are made from ceramic material.

4. The apparatus as defined in claim 1, wherein said means for raising and said means for withdrawing the at least one shaping die comprise at least one ram rigidly connected to said at least one shaping die and a vertically movable base plate provided in the hollow compartment, and wherein said at least one ram is fixed to said vertically movable base plate in the hollow compartment and has a predetermined length according to a predetermined height of a shaped region to be formed in the flat glass or glass ceramic article.

5. The apparatus as defined in claim 1, wherein the planar support plate is provided with through-going holes or is made from a porous material to assist in providing a suction force on the flat glass or glass ceramic article when said means for producing said low pressure acts to produce said low pressure in the hollow compartment and said flat glass or glass ceramic article rests on the planar support plate.

6. The apparatus as defined in claim 1, wherein the at least one shaping die is provided with through-going holes or is made from a porous material to assist in providing a suction force on the flat glass or glass ceramic article resting on the support plate when said means for producing said low pressure acts to produce said low pressure in the hollow compartment and said flat glass or glass ceramic article rests on the planar support plate.

7. The apparatus as defined in claim 1, wherein the means for removing the partially shaped flat glass or glass ceramic product from the planar support plate comprises mechanical means for raising the partially shaped flat glass or glass ceramic product.

8. The apparatus as defined in claim 7, wherein the mechanical means comprises lifting members for lifting the partially shaped glass or glass ceramic product.

9. The apparatus as defined in claim 1, wherein said means for partially heating the flat glass or glass ceramic article is a gas burner or IR radiator that has a heating power of up to 1 $MW/m^2$.

10. The apparatus as defined in claim 1, wherein said at least one shaping die is formed so that raised or embossed regions of complex shapes are formed in the fiat glass or glass ceramic article.

* * * * *